Patented May 14, 1946

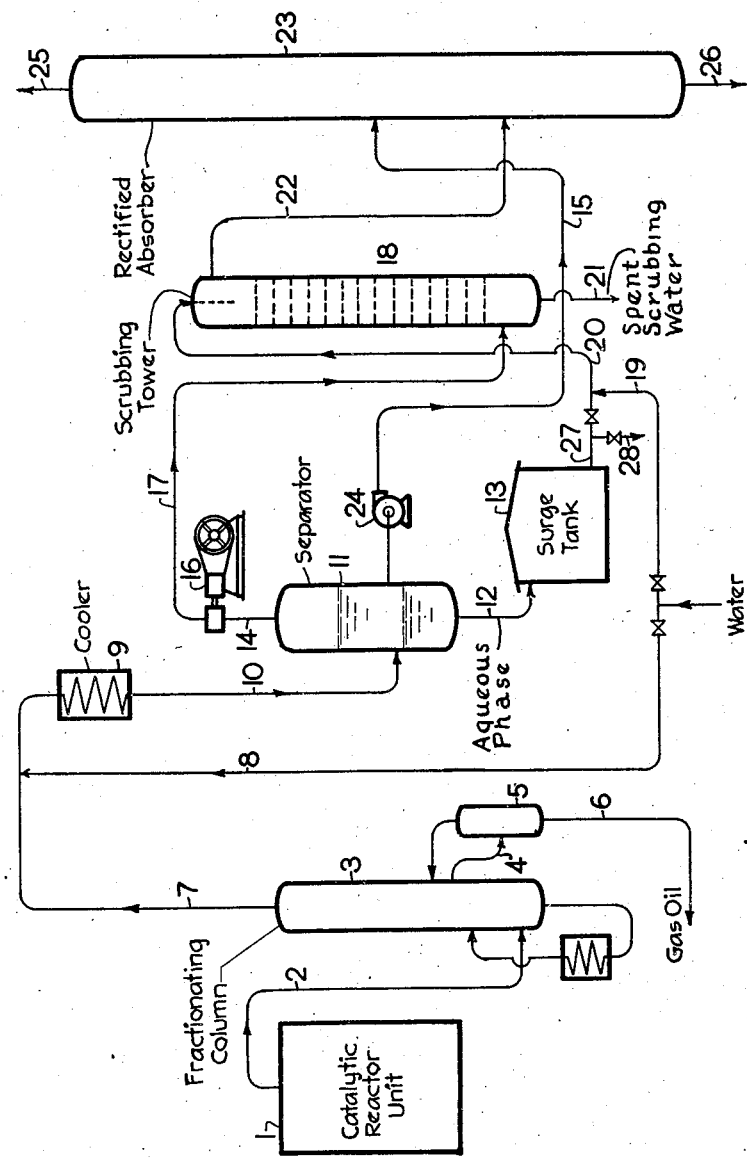
Fig. I
Inventors: George C. Montgomery
Rulon W. McOmie
By their Attorney:

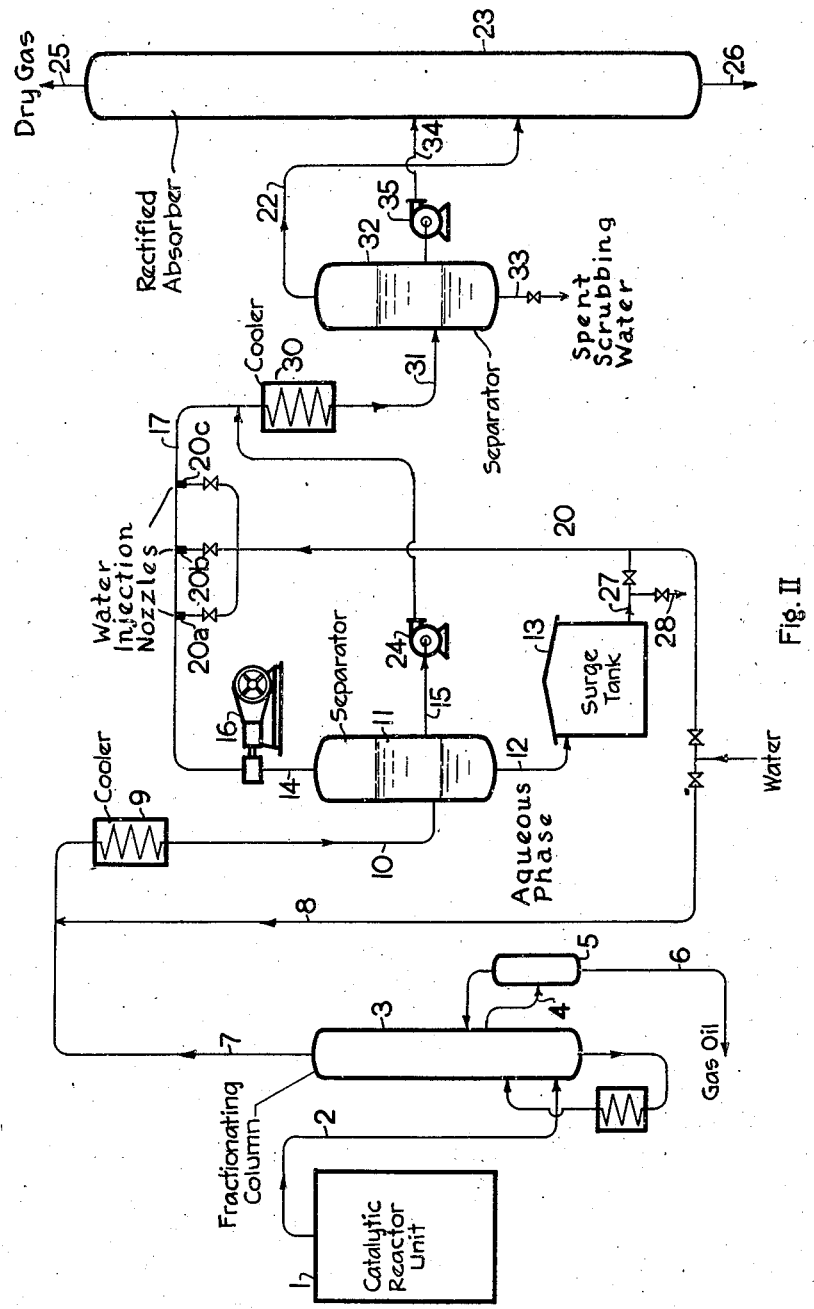
Fig. II

2,400,431

UNITED STATES PATENT OFFICE 2,400,431

PRODUCTION OF CATALYTICALLY CRACKED GASOLINE

George C. Montgomery and Rulon W. McOmie, Wilmington, Calif., assignors to Shell Development Company, San Francisco, Calif., a corporation of Delaware Application January 8, 1945, Serial No. 571,830

4 Claims. (Cl. 196—52)

This invention relates to the production of normally gaseous products and normally liquid hydrocarbon products of the nature of gasoline by the catalytic cracking of hydrocarbon oils with clay-type cracking catalysts and relates more particularly to an improved method for the separation and recovery of said products from the cracked hydrocarbon product of said catalytic cracking treatment.

The object of the invention is to provide an improved method for the separation and recovery of normally gaseous products and normally liquid hydrocarbon products of the nature of gasoline from the cracked products obtained by the catalytic cracking of hydrocarbon oils with clay-type cracking catalysts.

The cracking of hydrocarbon oils such as gas oils, stove oils, heavy naphthas, reduced crudes, and the like is usually carried out for the purpose of producing valuable hydrocarbon gases such as the $C_3$ and $C_4$ olefins or for the purpose of producing normally liquid products of the nature of gasoline or for both of these purposes. In any case cracking to produce either of these products produces appreciable amounts of the other product. These products cannot be used together and it is therefore the universal practice to separate and recover them as separate products. This is most commonly effected by condensing the major part of the normally liquid hydrocarbons by indirect heat exchange and subjecting the remainder to one or more compression and cooling stages to condense further quantities of hydrocarbon products. A so-called dry gas consisting essentially of materials having a molecular weight below propylene is then separated and removed. This is usually done by means of rectified absorption. The $C_3$-$C_4$ fraction is then generally separated from the liquid product leaving a debutanized gasoline. The $C_3$-$C_4$ fraction so obtained is used either for the production of additional amounts of high grade gasoline components by polymerization, alkylation, or the like, or is used for the production of valuable chemicals such as alcohols, ketones, aldehydes, butadiene, etc.

In recent years the older thermal cracking methods have been largely supplanted by more modern catalytic cracking processes. These processes, while they differ widely in the means of contacting the catalyst with the oil to be cracked, are similar in that all of them utilize a catalyst of the same general type and all of them produce products of the same general character. The catalysts used in these processes comprise certain selected natural clays and earths, modified clays, and various synthetic clay-type catalysts. The clays are sometimes used in their natural state but are usually treated and/or modified, for instance, by acid washing, removing iron-bearing impurities, leaching out alumina, adjusting the ratio of silica to alumina and/or by incorporating minor amounts of promoters in order to increase their activity, stability, etc., and to reduce their carbon forming tendency. Various synthetic clay-type cracking catalysts are also now widely used. These catalysts consist largely of silica and/or alumina and/or magnesia, and are often modified by minor amounts of such materials as $B_2O_3$, $AlF_3$, $AlPO_4$, $ZrO_2$, etc.

In these processes the oil to be cracked is contacted in the vapor phase with the catalyst under suitable conditions of pressure and residence time at a temperature in the order of 800° F. to 1050° F. depending upon the particular hydrocarbon feed, the particular catalyst and the particular results desired. The vaporous product containing cracked and uncracked material is partially cooled to condense uncracked and insufficiently cracked material which is withdrawn. The remaining vapor consists essentially of normally gaseous products and normally liquid products of the nature of gasoline. This material is then separated into a dry gas fraction, a $C_3$-$C_4$ fraction which is usually used as an alkylation feed, and a debutanized gasoline fraction by the method outlined above.

Plant experience has shown, however, that in the recovery of these products from catalytic cracking operations with clay-type catalysts considerable difficulty is encountered with fouling and corrosion of the equipment, particularly the rectified absorber. These troubles have been traced to the effect of traces of nitrogen compounds formed when using clay-type cracking catalysts.

The nitrogen compounds are present only in traces (less than 0.025%). Furthermore, they are found to be very difficult to remove, ordinary water washing of the distillate, for example, being unsuccessful. It is now found that due apparently to azeotropy these materials (certain cyanides) are present largely in the vapor phase and that they can be effectively removed by treating the normally gaseous portion of the product while under pressure with copious amounts of water. It is found that the treatment of the normally gaseous portion of the product with water should be carried out under a pressure of at least 3 atmospheres and that at least a mol excess of water with respect to the normally gaseous portion of the product, and preferably considerably more, should be employed. (A mol excess of water is an amount of water greater than 1 gm. mol per each 22.4 liters of the gas or vapor treated as measured under standard conditions.) It is furthermore found that the normally gaseous portion of the product should be contacted very thoroughly with the water as by injecting the water in the form of a fog or fine spray into the compressed normally gaseous products or by passing the compressed normally gaseous products up through an efficient scrubber such as a bubble tower or packed column. Furthermore, it is found that it is advantageous to first contact the total reaction product with water to remove ammonia and then use the ammoniacal aqueous solution to treat the normally gaseous products. When the normally gaseous portion of the products of such catalytic cracking processes are treated in the described manner little or no fouling or corrosion of the equipment, and particularly the rectified absorber, takes place.

The process of the invention will be described in more detail in connection with typical operations. To assist in this description reference is had to the attached drawings wherein there are shown by means of conventional figures not drawn to scale two assemblies of conventional apparatus arranged for operation in accordance with the process of the invention. Referring to the drawings, Figure I, the catalytic cracking operation is considered as taking place in the catalytic cracking unit 1 in the presence of a clay-type cracking catalyst. Since the actual mechanics of the cracking operation per se do not enter into the invention the catalytic cracking unit is indicated simply by a labelled rectangle. The product from the catalytic cracking operation consistsing of gas, gasoline, and uncracked products in the vapor state passes via line 2 to a fractionating column 3 of conventional design. Heavy oil such as gas oil is removed via line 4, side stripper 5 and line 6. The vaporous product removed overhead via line 7 consists essentially of normally gaseous products and normally liquid products of the nature of gasoline. This material is cooled by a combination of direct and indirect heat exchange sufficient to condense the bulk of the normally liquid products. Thus, water is injected via line 8 preferably as a spray and the mixture is further contacted and cooled in cooler 9. The amount of water injected at this point is substantial and is preferably such that water is in mol excess with respect to the liquid hydrocarbon condensate. This water serves a multi-fold purpose. It extracts the major amount of the small amount of ammonia invariably present in the products from catalytic cracking operations with clay-type cracking catalysts. This not only protects the cooler tubes but, as will be pointed out below, produces a dilute solution of ammonia which may be advantageously used in the subsequent steps of the process. Also, it allows the condensation to be effected with smaller amounts of cooling water, as compared with indirect cooling. The mixture of water and hydrocarbon products passes via line 10 to a separator 11 wherein it is separated into a gaseous phase consisting essentially of normally gaseous hydrocarbon products, a liquid hydrocarbon phase of the nature of gasoline, and a lower aqueous phase. The lower aqueous phase containing small amounts of ammonia (pH about 8.5 to 9) is withdrawn via line 12 to a surge tank 13. The gas phase and liquid hydrocarbon phase are separately withdrawn via lines 14 and 15. The gas phase is compressed by compressor 16 to a pressure above 3 atmospheres, for example between about 10 atmospheres and 20 atmospheres, and passed via line 17 to the bottom of a scrubbing tower 18. An amount of water in mol excess with respect to the gas is introduced into the scrubbing tower via lines 19 and 20, and after passing through the scrubbing tower it is removed via line 21. The compressed gas after passing through the scrubbing tower in intimate contact with the mol excess of water is withdrawn via line 22 and passed to the rectified absorber column 23. The condensed liquid hydrocarbon fraction withdrawn via line 15 is pumped via pump 24 into the rectified absorber column 23. A so-called dry gas consisting essentially of all of the product having a molecular weight below propylene is removed from the top of the rectified absorber via line 25. A liquid hydrocarbon fraction consisting essentially of gasoline and containing the $C_3$ and $C_4$ components of the product in solution is withdrawn from the rectified absorber via line 26. This fraction may be subsequently separated into a $C_3$–$C_4$ fraction and a debutanized gasoline in a conventional so-called debutanizer column (not shown).

As pointed out above, the products of catalytic cracking with clay-type cracking catalysts invariably contain small amounts of ammonia. This ammonia is largely extracted by the water injected via line 8 and is found in the aqueous layer withdrawn from separator 11 to surge tank 13. This very dilute aqueous solution of ammonia (pH about 8.5–9) is superior to fresh water in the subsequent water treatment due to its mild alkalinity. Thus, according to a preferred embodiment of the invention water from surge tank 13 is used to treat the compressed vapors. This water may be passed to the scrubber 18 via lines 27 and 20. Excess water, if any, may be withdrawn via line 29.

The described operation is very effective in eliminating fouling and corrosion troubles in the rectified absorber but has a disadvantage that very large amounts of water are required. Thus, in a typical cracking plant cracking 15,000 barrels per day of oil, the amount of water injected via line 8 may be, for example, in the order of 20,000 pounds per hour and that fed to scrubber 18 may be, for example, anywhere from 20,000 pounds per hour up to, for instance, 120,000 pounds per hour. This water is preferably treated water, i. e., softened water. By utilizing the condensate from separator 11 in scrubber 18, not only is the treatment made more effective but the amount of water required is greatly reduced.

A suitable treatment may also be carried out in the manner illustrated in Figure II of the drawings. Referring to Figure II, the vaporous hydrocarbon product from the catalytic cracking unit 1 passes to fractionating column 3 as described above in connection with Figure I. Water in an amount such as indicated is injected into the vapor stream via line 8 and the mixture is further cooled and passed to separator 11 as previously described. The lower aqueous phase is withdrawn via line 12 to surge tank 13. The upper gas phase is withdrawn via line 14 and is compressed by compressor 16 to a pressure of at least 3 atmospheres. A quantity of water in mol excess with respect to the compressed vapor is injected into the compressed vapor via line 20. This water is preferably injected by a plurality of nozzles such as 20a, 20b and 20c as a fog or fine mist. Nozzles of the type which atomize the water by means of impinging streams are found to be quite suitable. Simple sprays are relatively inefficient and if they are used much greater quantities of water are necessary for optimum efficiency. The liquid hydrocarbon phase from separator 11 is withdrawn via line 15 and pump 24. This stream may advantageously be injected into the compressed vapor stream containing the fog of water prior to passing the mixture to the cooler 30. The mixture then passes via line 31 to a second or high pressure separator 32 wherein it is separated into an upper gas phase, a liquid hydrocarbon phase and a lower aqueous phase. The aqueous phase is withdrawn via line 33. The compressed gas is passed to the rectified absorber 23 via line 22. The liquid hydrocarbon phase is passed to the rectified absorber by line 34 and pump 35. The rectified absorber is operated in the conventional manner under conditions to produce dry gas which is withdrawn via line 25.

In this process, as in the process illustrated in Figure I, it is advantageous and desirable to use the dilute ammoniacal aqueous phase from separator 11 to treat the compressed vapors. Thus, this material may be fed from the surge tank 13 to the fog nozzles via lines 27 and 20. Excess water, if any, may be withdrawn via line 28.

While in the above the process of the invention has been described with a single compression of the gaseous portion of the product, it will be understood that two or more compression states may be applied. In such cases the treatment of the compressed vapors may be effected at any point or points where the pressure is at least 3 atmospheres. The treatment is preferably effected, however, at the highest compression stage where the pressure is usually in the order of 20 atmospheres.

We claim as our invention:

1. In a process for the production of normally gaseous hydrocarbon products and normally liquid hydrocarbon products of the nature of gasoline from hydrocarbon oils containing nitrogen compounds by catalytic cracking with clay-type cracking catalysts, the combination of process steps comprising condensing the major portion of the normally liquid hydrocarbons of the nature of gasoline from the vaporous cracked products of said catalytic cracking treatment in the presence of added water, compressing the uncondensed vapors to a pressure of at least 3 atmospheres, intimately contacting said vapors while in said compressed state with a mol excess of water thereby to extract cyanides, separating said water containing extracted cyanides and contacting the compressed gas with said first liquid hydrocarbon condensate under rectified absorption conditions.

2. In a process for the production of normally gaseous hydrocarbon products and normally liquid hydrocarbon products of the nature of gasoline from hydrocarbon oils containing nitrogen compounds by catalytic cracking with clay-type cracking catalysts, the combination of process steps comprising condensing the major portion of the normally liquid hydrocarbons of the nature of gasoline from the vaporous cracked products of said catalytic cracking treatment in the presence of added water, separating the resultant mixture into a gaseous phase, a liquid hydrocarbon phase and a lower aqueous phase, compressing the uncondensed vapors to a pressure of at least 3 atmospheres, intimately contacting said vapors while in said compressed state with a mol excess of said lower aqueous phase thereby to extract cyanides, separating said aqueous phase containing extracted cyanides, and contacting the compressed gas with said first liquid hydrocarbon condensate under rectified absorption conditions.

3. In a process for the production of normally gaseous hydrocarbon products and normally liquid hydrocarbon products of the nature of gasoline from hydrocarbon oils containing nitrogen compounds by catalytic cracking with clay-type cracking catalysts, the combination of process steps comprising condensing the major portion of the normally liquid hydrocarbons of the nature of gasoline from the vaporous cracked products of said catalytic cracking treatment in the presence of added water, compressing the uncondensed vapors to a pressure of at least 3 atmospheres, injecting a mol excess of water in the form of a fine mist or fog into said vapors while in said compressed state to extract cyanides, separating said water containing extracted cyanides and contacting the compressed gas with said first liquid hydrocarbon condensate under rectified absorption conditions.

4. In a process for the production of normally gaseous hydrocarbon products and normally liquid hydrocarbon products of the nature of gasoline from hydrocarbon oils containing nitrogen compounds by catalytic cracking with clay-type cracking catalysts, the combination of process steps comprising condensing the major portion of the normally liquid hydrocarbons of the nature of gasoline from the vaporous cracking products of said catalytic cracking treatment in the presence of added water, separating the resultant mixture into a gaseous phase, a liquid hydrocarbon phase and a lower aqueous phase, compressing the uncondensed vapors to a pressure of at least 3 atmospheres, injecting a mol excess of said lower aqueous phase in the form of a fine mist or fog into said vapors while in said compressed state to extract cyanides, separating said aqueous phase containing extracted cyanides and contacting the compressed gas with said first liquid hydrocarbon condensate under rectified absorption conditions.

GEORGE C. MONTGOMERY.
RULON W. McOMIE.